Aug. 20, 1929.  T. M. EYNON  1,725,573
LIQUID LEVEL INDICATOR
Filed Feb. 28, 1925
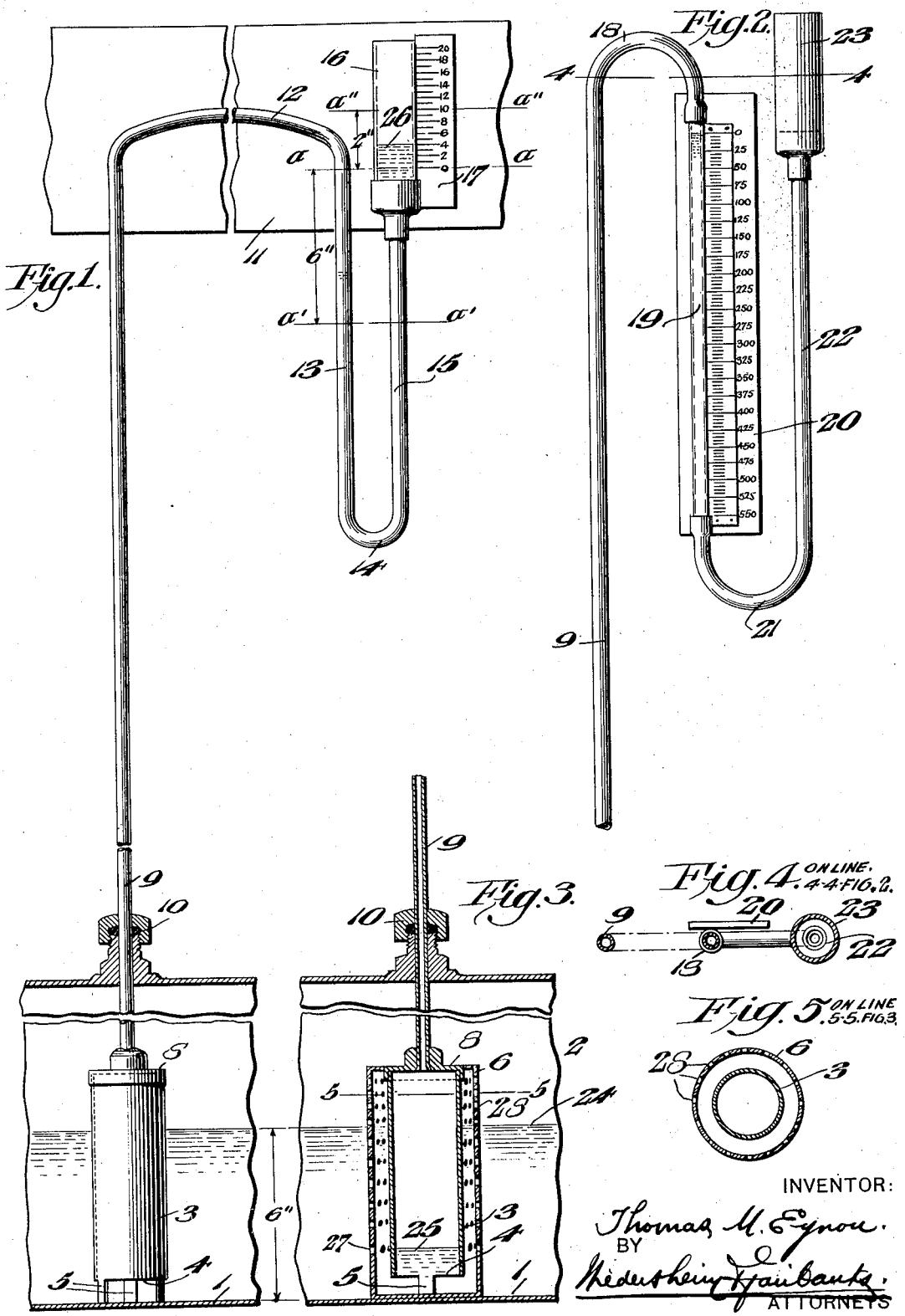
INVENTOR:
Thomas M. Eynon.
BY
ATTORNEYS Patented Aug. 20, 1929.

1,725,573

UNITED STATES PATENT OFFICE.

THOMAS M. EYNON, OF PHILADELPHIA, PENNSYLVANIA.

LIQUID LEVEL INDICATOR.

Application filed February 28, 1925. Serial No. 12,203.

My invention consists of a novel construction of a liquid level indicator, which is capable of general application, but is especially adapted for utilization in connection with the instrument board of an automobile to indicate the height of the gasoline level in the gasoline tank, my novel device being devoid of any moving parts, and the indicating device being operated under or subjected to variations of pressure contained within a casing closed at its top and open at its bottom and contained within said gasoline tank, the closed top of said casing communicating through a U tube of a length substantially equal to the height of the tank, with an open ended cup of lesser diameter and capacity than said casing.

My invention further consists, in conjunction with a device having the above characteristics, of a perforated outer baffle casing surrounding the above mentioned casing and contained in the gasoline tank, so designed that any splashing of the gasoline, or other liquid being measured, will not affect the correct and accurate measuring of the liquid and the proper reading of the indicating devices on the instrument board.

It further consists of a novel construction of an automatic indicating device, operated solely by variations of pressure within the casing contained in the gasoline or other liquid tank, and wherein I dispense entirely with a float in the gasoline chamber and with all mechanical or moving connections intermediate said gasoline chamber and the indicating device, so that there is no liability of the apparatus getting out of order, after being installed in position, and owing to its great simplicity and the absence of any mechanical connections, it can be readily installed in any suitable tank without the employment of skilled labor and without dismantling or taking down any of the standard automobile units, it being immaterial in the case of an automobile whether the gasoline tank is located in the rear of the automobile or in any other position upon the chassis.

My invention further consists of a novel indicator, in which the reading of the scale will not be affected by changes in temperature or altitudes, no special chemical fluid being required, and as no float is employed it can be used on all makes and positions of gasoline or other tanks and its operation is not affected by the varying positions or inclinations of the gasoline tank during the progress of the automobile up or down grades, hills, mountains or the like.

It further consists of other novel features of construction and advantage all as will be hereinafter fully pointed out and set forth in the claims.

For the purpose of illustrating my invention I have shown in the accompanying drawings forms thereof which are at present preferred by me, since they have been found in practice to give satisfactory and reliable results, although it is to be understood that the various instrumentalities of which my invention consists can be variously arranged and organized and that my invention is not limited to the precise arrangement and organization of these instrumentalities as herein shown and described.

Fig. 1 represents a vertical sectional view of a liquid level indicator embodying my invention, the tank being shown in section and the baffle cylinder shown in Figs. 3 and 5 has been omitted for the purpose of more clearly illustrating the casing.

Fig. 2 represents a side elevation of the U tube and its adjuncts, showing a modified form of my invention, as applied to tanks of greater depths.

Fig. 3 represents a vertical sectional view of the gasoline tank, the baffle casing and its adjuncts.

Fig. 4 represents a section on line 4—4 of Fig. 2.

Fig. 5 represents a section on line 5—5 of Fig. 3.

Referring to the drawings:—

In carrying out my invention I position on the base 1 of the gasoline or other tank 2, a casing 3, which is open at its bottom 4, and closed at its top, and provided with the feet 5, which may rest directly upon the bottom 1 as seen in Fig. 1 or said casing 3 may be contained within the perforated outer baffle casing 6, which is closed at its bottom and open at its top and provided with the perforations 27 as seen in Fig. 3. The lowermost row of small holes 27, while admitting the liquid to the casing 3, are a sufficient distance above the open bottom 4 of the casing 3, to maintain a liquid seal about said opening 4 at all times regardless of the amount of liquid in the tank, by retaining a quantity of the liquid in the bottom of the outer baffle casing 6, to the level of the lowermost row of holes 27. 8 designates the top of the casing 3 from which extends the pipe 9, through the stuffing box 10 on the top of the tank 1, said pipe extending upwardly in proximity to the instrument board 11, at about which point it is deflected laterally as at 12, thence downwardly as at 13 to the point 14, whence it extends upwardly as at 15, the branches 13 and 15 forming a U tube, and the latter branch thereof discharging into the enlarged tube 16, opposite to which is the scale 17. This embodiment of my invention (Fig. 1) is particularly adapted for relatively shallow tanks as used on automobiles, where the reading of the scale is confined to a vertical height of from two to three inches, suitable for the instrument board of the automobile.

In the construction seen in Figs. 2 and 4, which is particularly adapted for tanks of greater depth, such as storage tanks, and in which a greater scale length is required for accuracy, due to the greater depth to be measured; the pipe 9 is bent at 18 and connected to the transparent vertical member 19 opposite to which is the scale 20. The vertical member 19 connects with the bend 21 and the bend 21 is continued upwardly to form the branch 22 upon the upper end of which is the enlarged tubular or cup-shaped member 23, corresponding to the member 16. By this modification of my invention it is possible to have a scale length equal to about three quarters of the diameter or height of the tank, thereby obtaining greater accuracy in the measurement. When the gasoline level is at about the point 24, the level of the liquid in the casing 3 will be as indicated at 25, and the level of the liquid in the cup 16 will be as indicated at 26.

The operation of my novel liquid level indicator is as follows:—A liquid indicating medium, preferably a light non-volatile oil, is placed into the limbs 13 and 15 of the U tube, to a level of the zero on the scale 17. The cylindrical casing 3 is then immersed into the gasoline or other liquid, or, as it would be carried out normally, the tank 2 is filled with gasoline in the usual way, while the casing cylinder 3 is in position. The cylinder 3, as well as the communicating tubing being filled with air, the gasoline rises in the casing 3 and forces the air out of the cylinder 3 into the communicating tubing 9 and 12, thereby forcing the level of the indicating medium in the glass 16, upwardly. By properly selecting the relative diameters of the cylindrical casing 3, and the gauge glass 16, the indicating medium in the gauge glass may be made to rise any suitable amount for a certain rise in the level of the gasoline in the tank. These two diameters are therefore determined by the conditions of the installation in any particular case. Since the rise of the level of the liquid indicating medium in the U tube is entirely dependent for a given indicator liquid on the height of the liquid in the tank, and the relative diameters of the casing 3 and the glass 16, and since such diameters are fixed in any particular case, the rise in the level of the indicating medium will indicate accurately at all times the exact level of the liquid in the tank, regardless of the temperature of the tank, the liquid contained therein, or the temperature of the communicating tubing and the air contained therein. Thus on raising the temperature of the gasoline or the communicating tubing, the surface 25 of the gasoline in the cylinder casing 3 is merely lowered, without however affecting the reading on the scale 17, since the level 24 of the gasoline in the tank is not appreciably affected by any expansion of the air in the communicating tubing.

The baffle cylinder or casing 6 shown in Figs. 3 and 5, serves two purposes. It first acts as a baffle wall surrounding the opening 4 at the bottom of the cylindrical casing 3, so as to prevent, any momentary variations in the level of the gasoline in the tank, or any splashing of the gasoline, from materially affecting the level of the liquid indicating medium in the glass 16; that is preventing any fluctuation in the reading of the gauge due to such splashing. This baffle wall tends to give, what might be called, an average reading of the level of the gasoline, instead of a fluctuating reading. The second purpose of the outer baffle cylinder or casing 6, is to retain a certain amount of liquid, gasoline, around the bottom opening 4 of the cylindrical casing 3 at all times, even though the gasoline tank may be emptied completely as might happen occasionally in practice. Thus the lower openings or apertures 27 which extend around the cylindrical surface of said baffle wall, are a certain distance above the level of the opening 4, thereby retaining a liquid seal around said lower opening 4, at all times.

The condition that has made it impossible in the past, to use gages, where an exact visual reading of the quantity of liquid in the tank is at all times demanded, when air or liquids are used to transmit the pressure from the tank to a remote distance where the gage or scale is located; is the expansion and contraction of the transmitting medium by the constantly changing temperature, both of the instrument itself, and of all the pipes used in transmitting the pressure to the instrument.

I have overcome the effects of expansion and contraction, due to the changes in temperature, by a very scientific, practical and cheap means, which I have proved to be correct, both by the laboratory test and by actual service.

It will now be apparent that I have devised a novel and useful construction of liquid level indicators which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent is:—

1. Liquid level measuring apparatus of the character stated, comprising a receptacle containing liquid to be measured, a casing having a closed top and an open bottom arranged in said liquid, a stuffing box for said receptacle, a pipe extended from the top of said casing through said stuffing box and having its upper end bent downwardly and then upwardly to form a U tube, part of which is transparent, an elongated open top container carried by said U tube which container is of lesser diameter and capacity than said casing, and a perforated baffle cylinder surrounding said casing which baffle cylinder is closed at its bottom and open at its top, said baffle cylinder being seated upon the receptacle bottom with the open bottom of said cylindrical casing spaced from the baffle cylinder bottom.

2. Liquid level measuring apparatus of the character stated comprising a receptacle containing liquid to be measured, a stuffing box for said receptacle, an inner, cylindrical casing having an open bottom, said casing being arranged in the liquid to be measured, feet for supporting said cylindrical casing, a removable closure for the top of said casing, a pipe extended from said removable closure through said stuffing box and having its upper end bent to form a U tube, an elongated open top cylindrical container carried by the upper end of said U tube, part of which U tube is transparent, said container being of lesser diameter and capacity than said inner cylindrical casing, an outer perforated baffle cylinder open at its top and closed at its bottom surrounding said inner casing, with the feet of the inner casing resting upon the bottom of said baffle cylinder, there being an air cushion formed between the closed top of the inner casing and the liquid in the lower portion thereof, said open top container and U tube being provided with a liquid, and a scale for indicating the variations in height of said liquid.

THOMAS M. EYNON.